July 24, 1928.
R. B. MARTIN
PROCESS FOR THE PRODUCTION OF OXIDIZED PRODUCTS
Filed Oct. 30, 1920
1,678,403
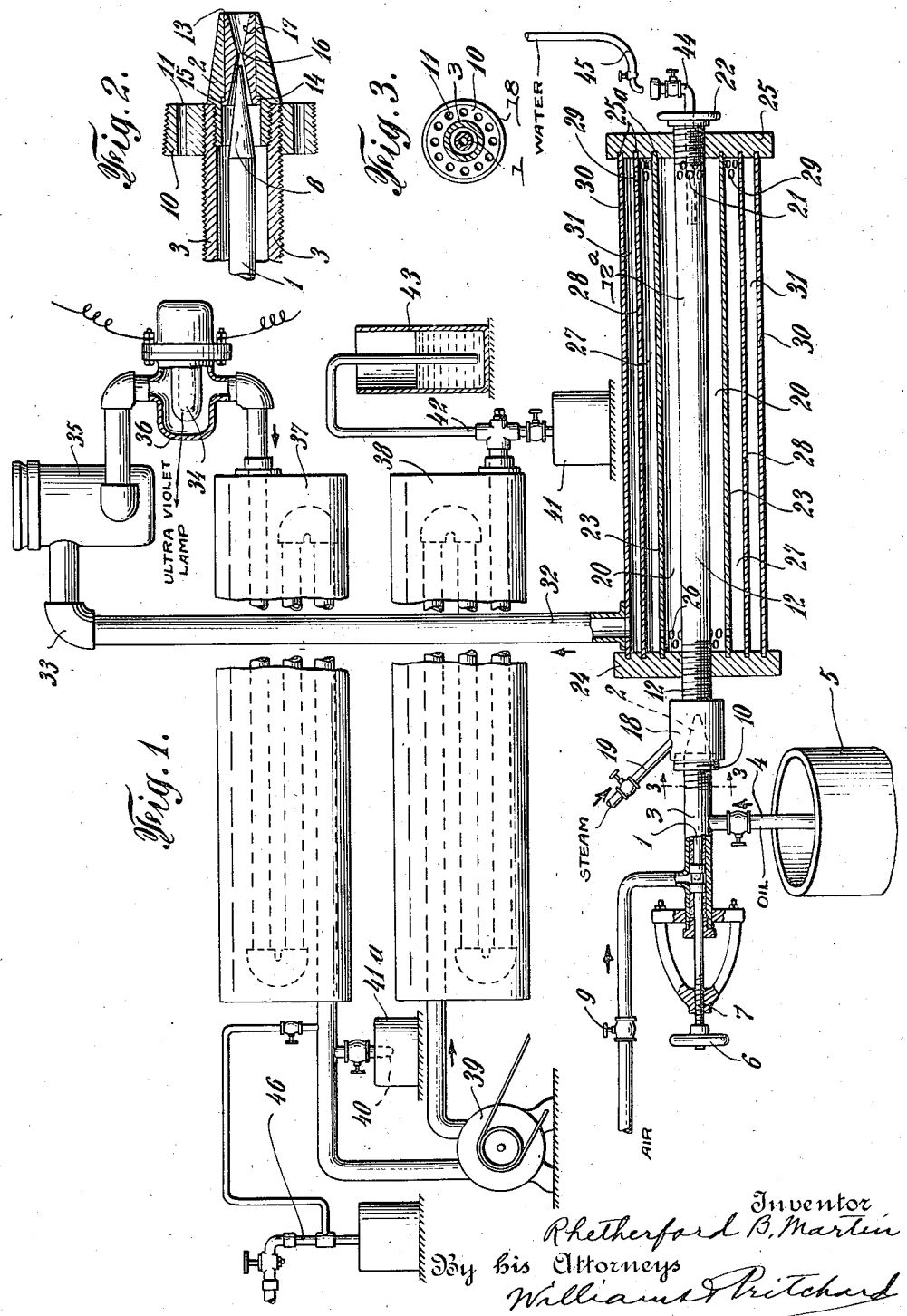
Inventor
Rhetherford B. Martin
By his Attorneys
Williams & Pritchard Patented July 24, 1928.

1,678,403

UNITED STATES PATENT OFFICE.

RHETHERFORD B. MARTIN, OF NEW YORK, N. Y., ASSIGNOR TO MINERALS SEPARATION NORTH AMERICAN CORPORATION, OF NEW YORK, N. Y., A CORPORATION OF MARYLAND.

PROCESS FOR THE PRODUCTION OF OXIDIZED PRODUCTS.

Application filed October 30, 1920. Serial No. 420,808.

This invention relates to processes for the production of oxidized products and is herein disclosed as applied to the partial oxidation of oils like the heavy petroleum distillates, with the production more especially of products adapted to serve as mineral-frothing agents but which also have other uses. The products may be quite variable and complex, but are found to be useful when the process is so controlled as to produce aldehydes, or aldehyde-like bodies, to a notable extent. The apparatus and process of the present disclosure provide means for converting oil, or a very large part of it, into a vapor or atomized mist which is finely divided and permanent enough to be mixed with air, and may be brought, advantageously, in a somewhat heated condition, into the presence of forces which will induce the desired reactions without producing material quantities of troublesome by-products such as carbon and practically never any coke.

In the form herein disclosed, a mercury vapor quartz ultra-violet lamp produces a very efficient means for inducing the desired reactions and easily controlling them. The structure herein disclosed in some detail may include means for positively controlling the flow of vapor, air and gases past the lamp or other device, thus permitting the ready control of conditions to obtain products which are commercially useful. It has been found that valuable products can be obtained from petroleum distillates such as kerosene and gas oil by air acting on them in very finely divided condition in the presence of ultra-violet light under conditions which produce a comparatively uniform yet partial or incomplete oxidation of the vapors. It has been found possible to produce a fog or vapor with no loss of hydrocarbons detectable by ordinary methods of analysis in the effluent gases which comprise one part of the product.

Working in the manner described with the apparatus especially adjusted to produce a mineral-frothing agent it has been found possible to produce such an agent superior to the best pine oils for most mineral froth-flotation purposes. Other features and advantages will hereinafter appear.

In the accompanying drawing is shown an apparatus used in carrying out the present invention.

Figure 1 is a diagrammatic view showing an apparatus suitable for carrying out the treatment of organic substances.

Figure 2 is a sectional detail view on a larger scale, showing some details of the vaporizer construction; and Figure 3 is a sectional end view of a part of the vaporizer.

Air at a pressure of about 30 pounds to the square inch is led through an air-injector tube 1 to the nozzle 2 of a surrounding tube 3, said tube 3 having a valved oil suction tube 4 to draw kerosene, or paraffin gas oil from a suitable source, indicated as an open reservoir 5. The air-injector tube may be adjusted back and forth by a handle 6 which turns it in a screw thread 7, so that its tip 8 may be set at any desired position relatively to the nozzle point 2. The air pressure may be regulated by a suitable valve 9. The tube 3 is held in any suitable manner, as by being threaded into a plug 10, which is shown as provided with twelve quarter-inch perforations 11 (see Figure 3) and closes the open end of a barrel 12. The barrel 12 serves as a burning chamber and flame-controlling surface, so that when the stream of air and oil issuing from the nozzle 2 is lighted through the perforations 11, the flame may be adjusted to consume only a very small part of the oil introduced in this way, while the major part of the oil is converted into a mist or vapor by the heat of burning the small portion of the oil. The nozzle shown herein proves very satisfactory. Its tapered tip has set into it a bushing 13 having a minimum bore of $\tfrac{1}{16}$ inch, widening at the ends from the throat 17. A flange 14 seating in an inner shelf 15 of the tube 3 holds the bushing in place. The hollow air pipe 3 is drawn down almost to a $\tfrac{1}{16}$ inch opening at its point 16, and is usually most efficient when adjusted to deliver air about at the throat 17 so that a cone or tulip shaped flame is formed in the barrel 12. The barrel 12 has been found to work satisfactorily when about 3 feet long. It is shown as made up of a long pipe, 12$^a$, which works satisfactorily when of two-inch piping, and a coupling 18 threaded thereon at the vaporizer nozzle end and the perforated plug 10 is shown as threaded into the coupling 18. The last 30 inches of the length of the barrel 12, including the greater part of the length of the pipe 12ª is surrounded by a chamber or series of chambers hereinafter described which are warmed or heated thereby. A small valved inlet pipe 19 enters the side of the coupling 18 so as to be adapted to deliver steam or a diluent gas, or a gas adapted to play some other part in the subsequent reactions of the vaporized mixture formed by burning part of the oil. The inlet pipe 19 is shown as set obliquely so as to deliver the steam or other substance into the vapor mixture much in the same direction that the mixture is already traveling. So far as can be easily observed, the flame in the barrel 12 frequently extends its whole length, but the flame produces the best results for the purposes described below when it is caused to assume a cone or tulip shape near the end of the nozzle 2.

The vapor or misty mixture produced by thus burning a small part of the oil leaves the barrel 12 and enters a chamber 20 forming part of the warming device referred to above, there being provided for this purpose suitable perforations 21 in the periphery of the barrel 12 near the cap 22 which closes its end. The chamber 20 has been found satisfactory if formed by a 3-inch pipe 23 held concentric with the barrel 12 by flanges 24, 25, which have been made of cast iron disks threaded and screwed upon the barrel 12, and provided with suitable annular grooves 25ª to hold the pipe 23 in place. The chamber 20 conveys the vapors back toward the nozzle 2 and from this they pass through perforations 26 in the 3-inch pipe 22 into a chamber 27 formed by a 4-inch pipe 28 supported similarly to the 3-inch pipe 23. In this chamber the vapors are led to the end adjacent the cap 22, whence they pass through suitable perforations 29 into a chamber 31 formed by a 5-inch pipe 30 supported like the 3-inch and 4-inch pipes. These pipes have been found very satisfactory if made of wrought iron about ¼ inch thick, thus making the chambers 20, 27 and 31 each long narrow chambers of about ¼ inch clearance between the walls, with the result that the mixed vapors or mist and air are close to the metal walls and are kept hot by the radiated heat of the combustion taking place in the barrel 12. The structure formed by the barrel 12 and the pipes, including the pipe 30, works well when housed in a brick support (not shown) which prevents rapid radiation of the heat. The perforations 21, 26 and 29, have been found satisfactory if the total area of the perforations in any pipe is double the sectional area of the barrel 12. From the chamber 31 the vapors are led by a suitable pipe 32 of considerable length, and provided with an elbow 33, to a horizontal ultra-violet lamp 34. Interposed in the stretch of pipe 32 is a safety explosion chamber 35 which has a large easily displaceable cap and serves to absorb any shock caused by an explosion, and thus protect the apparatus from explosions in the chambers 20, 27 and 31.

The lamp 34 has been found satisfactory if it is a mercury vapor quartz lamp of the R. U. V. Corporation, having a 2-inch quartz hood or barrel and working at 4 amperes and 120 volts D. C. It is found that the lamp should run one-half hour or more to establish an equilibrium before all the conditions of operating the apparatus can be satisfactorily adjusted to the most efficient points. The lamp 34 is set transversely of the current of air, vapors and products in a metal barrel 36 made of 4-inch iron pipe so that there is hardly an inch clearance around the lamp in which the vapor flows, with the result that all the mixed vapor and air and other substances present may be thoroughly exposed to the rays of the lamp and the excess air present caused to react with the oil vapor or mist and other substances.

If the lamp becomes coated with vaporization products which condense, or with by-products, the trouble can usually be remedied by raising the temperature of the vapor or increasing the supply of air or oxygen, or by increasing both the temperature and the oxygen. If the oxidation is mild the product appears to contain a relatively large proportion of aldehydes. If the oxidation is intense, it appears to produce a relatively large proportion of ketones, together with formic and oxalic acids. From the lamp casing 36 the vapors in one apparatus were led to a condenser formed of two sections 37 and 38, forty feet each in length, of 1½ inch iron pipe, led through tanks of water at outdoor temperature. It seems advantageous to draw the vapors through the condenser 37 by a Croswell rotary blower pump 39 between the two sections of the condenser, thus maintaining a suction on the operating chambers and openings of the apparatus. A valved drip 40 may be provided between the first section 37 of the condenser and the suction pump 39 to draw off into a receiver 41ª, the liquid which condenses. At the end of the second section 38 of the condenser the remaining liquid products may be collected by a valved drip 41. The pump forces the uncondensed portions of the vapors and products along through a valved pipe 42 to a tank 43 in which the effluent gases may be used for any desired purpose, or may be collected by being in part absorbed in sodium bisulphite, for example.

It has been found that water may be delivered as such, instead of as steam, to the volatilized oil. For this purpose a small valved tube 44 threaded into the cap 22 and carried into the barrel 12 to clear the perforations 26 may have water fed into it at a suitable rate from any convenient source diagrammatically shown as a tap 45. It has been found that water may be so fed that it is completely vaporized with the result that this inhibits the formation of the small quantities of carbon or lamp black which otherwise sometimes occurs. Coke never seems to form when kerosene oil or paraffin gas oil are oxidized in the apparatus of the present invention to produce the products described above.

In order to control the character of product formed it is usually sufficient to withdraw continuously a small sample of the gaseous product and correct the adjustment of the burner or vaporizer according to the observed characteristics.

When a liquid condensate is collected for froth-flotation purposes, it is found that the gas withdrawn by a small filter pump 46 from a valved connection between the condensers 37 and 38 gives to the effluent water a pleasing odor of orange peel. The gaseous product unmixed with water under these conditions has a suffocating odor of aldehydes.

Dilution of the oxidizing air with ethylene or hydrogen sulphide resulted in products having remarkable value as frothing agents. Dilution of the air to reduce the percentage of available oxygen had no apparent beneficial effect. The amount of air used may be insufficient to effect complete combustion of the oil used. Carbon dioxide tended to precipitate what seemed to be carbon.

It has been found that the D. G. solar oil of the Texas Company which had resisted oxidation by a catalyst was readily oxidized by the apparatus described above to produce a very efficient froth-flotation agent.

The following table shows the size of the fractions distilled off at different boiling points of certain products made,—the corresponding fractions of the original oils being also shown for comparison:

| Distillation temperature | Original kerosene | Oxidized kerosene | Paraffin gas oil | Paraffin gas oil oxidized |
|---|---|---|---|---|
| | Per cent | Per cent | Per cent | Per cent |
| Boiling point up to 150°_ | 1.0 | 4.0 | | |
| 150–175°_ | 4.0 | 7.0 | | 4.0 |
| 175–200°_ | 15.0 | 14.0 | 1.0 | 4.0 |
| 200–225°_ | 34.0 | 35.0 | 5.0 | 7.0 |
| 225–250°_ | 28.0 | 24.0 | 8.0 | 15.0 |
| 250–275°_ | 16.0 | 11.0 | 19.0 | 22.0 |
| 275–300°_ | | | 26.0 | 23.0 |
| 300–325°_ | | | 13.0 | 20.0 |
| 325–350°_ | | | 14.0 | |
| Residue and loss_ | 2.0 | 5.0 | 14.0 | 5.0 |
| | 100.0 | 100.0 | 100.0 | 100.0 |

The amount of water formed in the apparatus apparently need not materially exceed that formed by combustion in the barrel 12. This collects in the receiver 41ª, usually with the oily product floating above it.

The gases escaping after condensing the oily oxidized product appeared to be of very complex composition but usually contained no methane or other hydrocarbon so far as ordinary analytical methods showed. These gases contained aldehyde or similar bodies collectible by alkali metal bisulphites apparently in considerable quantity. When water vapor was introduced in the form of steam to the atomized oil the following analyses of the effluent gases were obtained, when oxidizing gas oil and kerosene respectively.

| | Gas oil | | Kerosene | |
|---|---|---|---|---|
| | Steam limited amount | Steam in larger amount | Steam limited amount | Steam larger amount |
| $CO_2$ | 2.7 | 3.4 | 1.3 | 1.5 |
| $O_2$ | 9.0 | 12.9 | 13.4 | 16.2 |
| $CO$ | 2.3 | 1.1 | .5 | .3 |
| $H_2$ | .0 | .0 | .7 | 1.1 |
| Undetermined | 86.0 | 82.6 | 84.1 | 80.9 |

Having thus described certain embodiments of my invention, I claim:

1. The process which includes passing a continuous stream of hydrocarbons in vapor form mixed with oxygen past a source of ultra-violet light to produce compounds containing carbon combined with both oxygen and hydrogen, and condensing the condensable part of the product.

2. The process which includes treating hydrocarbons to form a continuous finely divided stream of vapor, mixing oxygen with the vapor, and carrying the vapor past a source of ultra-violet light to produce compounds containing carbon combined with both oxygen and hydrogen, and condensing the condensable part of the product.

3. The process which comprises finely dividing a hydrocarbon oil, and mixing therewith oxygen and a hydrogen-containing compound, and treating the mixture with ultra-violet light to produce by the action of all these factors compounds comprising both oxygen and hydrogen combined with carbon.

4. The process which comprises finely dividing a hydrocarbon oil, applying heat thereto by burning part thereof, and passing the resulting products mixed with oxygen past a source of ultra-violet light to produce compounds comprising both oxygen and hydrogen combined with carbon.

5. The process which comprises finely dividing a hydrocarbon oil, applying heat thereto by burning part thereof, and passing the resulting products mixed with oxygen and a hydrogen-containing compound past a source of ultra-violet light to produce compounds comprising both oxygen and hydrogen combined with carbon.

6. The process which comprises finely dividing a hydrocarbon oil, applying heat thereto by burning part thereof, and passing the resulting products mixed with oxygen and water vapor past a source of ultra-violet light to produce compounds comprising both oxygen and hydrogen combined with carbon.

7. The process which comprises finely dividing a hydrocarbon oil, applying heat thereto by burning part thereof, and passing the resulting products mixed with diluted oxygen past a source of ultra-violet light to produce compounds comprising both oxygen and hydrogen combined with carbon.

8. The process which comprises finely dividing a hydrocarbon oil, and conveying the finely divided oil mixed with insufficient free oxygen to effect complete combustion past a source of ultra-violet light to produce an aldehyde containing product.

9. The process which comprises finely dividing a hydrocarbon and conveying the finely divided hydrocarbon, mixed with diluted free oxygen in a quantity insufficient to effect complete combustion, past a source of ultra-violet light, and removing the product while it still is rich in compounds containing both oxygen and hydrogen combined with carbon.

10. The process which comprises finely dividing a hydrocarbon and conveying the finely divided hydrocarbon, mixed with a hydrogen-containing substance and with insufficient oxygen to effect complete combustion, past a source of ultra-violet light, and removing the product while it still is rich in compounds containing both oxygen and hydrogen combined with carbon.

11. The process which comprises finely dividing a hydrocarbon and conveying the finely divided hydrocarbon, mixed with a hydrogen-containing substance and with insufficient and diluted oxygen to effect complete combustion, past a source of ultra-violet light, and removing the product while it still is rich in compounds containing both oxygen and hydrogen combined with carbon.

12. The process which comprises finely dividing a hydrocarbon and conveying the finely divided hydrocarbon, mixed with insufficient air to effect complete combustion, past a source of ultra-violet light, and removing the product while it still is rich in compounds containing both oxygen and hydrogen combined with carbon.

13. The process which comprises finely dividing a hydrocarbon, and conveying the finely divided hydrocarbon, mixed with insufficient oxygen to effect complete combustion, past a source of ultra-violet light, and removing the product while it still is rich in aldehydes.

14. The process which comprises finely dividing a hydrocarbon and conveying the finely divided hydrocarbon, mixed with diluted free oxygen in quantity insufficient to effect complete combustion, past a source of ultra-violet light, and removing the product while it still is rich in aldehydes.

15. The process which comprises finely dividing a hydrocarbon and conveying the finely divided hydrocarbon, mixed with insufficient air to effect complete combustion, past a source of ultra-violet light, and removing the product while it still is rich in aldehydes.

16. The process which comprises finely dividing a petroleum oil and conveying the finely divided oil, mixed with insufficient free oxygen to effect complete combustion, past a source of ultra-violet light, and removing the product while it still is rich in aldehydes.

17. The process which comprises finely dividing a petroleum oil and conveying the finely divided oil, mixed with diluted oxygen in quantity insufficient to effect complete combustion, past a source of ultra-violet light, and removing the product while it still is rich in aldehydes.

18. The process which comprises finely dividing a petroleum oil and conveying the finely divided oil, mixed with insufficient air to effect complete combustion, past a source of ultra-violet light, and removing the product while it still is rich in aldehydes.

19. The process which comprises finely dividing a hydrocarbon, applying heat thereto by burning a part thereof, conveying the resulting products, mixed with insufficient free oxygen to effect complete combustion, past a source of ultra-violet light, and removing the product while it is still rich in aldehydes and like materials.

20. The process which comprises atomizing a hydrocarbon oil, mixing therewith oxygen and a hydrogen-carrying compound, and treating the mixture with ultra-violet light to produce aldehydes by the action of all these factors.

In testimony whereof, I have affixed my signature to this specification.

RHETHERFORD B. MARTIN.